Aug. 13, 1929.  W. A. ADAMS  1,724,815

COUPLING FOR ELECTRICAL FIXTURES

Filed Dec. 31, 1926

INVENTOR
Walter A. Adams
BY
H. J. Simms
his ATTORNEY

Patented Aug. 13, 1929.

1,724,815

UNITED STATES PATENT OFFICE.

WALTER A. ADAMS, OF ROCHESTER, NEW YORK.

COUPLING FOR ELECTRICAL FIXTURES.

Application filed December 31, 1926. Serial No. 158,393.

The present invention relates to couplings for electrical fixtures and an object thereof is to provide a coupling which will entirely enclose the conductor and, at the same time, permit the relative turning of the two coupling members without imposing on the conductor twisting strains which tend to injure the conductor.

To these and other ends, the invention consists of certain parts and combinations of parts all of which will be hereinafter described; the novel features being pointed out in the appended claims.

In the drawings:

Fig. 1 is a plan view of a coupling constructed in accordance with this invention;

Fig. 2 is a section on the line 2—2, Fig. 1; and

Fig. 3 is a section on the line 3—3, Fig. 2.

In the illustrated embodiment of the invention the coupling embodies two members 1 and 2 mounted for relative swinging. In this instance, the two members abut each other at the surfaces 3 and are held in abutting relation while permiting their relative turning in this instance by a combined clamping and pivoting member 4.

This clamping and pivoting member preferably has a circular opening, the wall 5 of which cooperates with a cylindrical projection 6 on the member 2 and defines the axis about which relative turning between the members takes place. The clamping and pivoting member 4 also cooperates with the bearing surface 7 on the member 2 at right angles to the cylindrical bearing surface of the cylindrical projection 6, so that the clamping and pivoting member 4 will not only hold the member 2 against the member 1 at their abuting surfaces 3, but will prevent relative shifting between the members transversely of the axis of turning. This clamping and holding member is preferably adjustably supported on the member 1 so that it may be adjusted to take up wear between the members. To this end the member 1 has a transverse groove 8 in which the end of a laterally turning portion 9 on the clamping and holding member 4 is mounted to rock. Between the rocking bearing for the clamping and holding member and the point where the clamping and holding member engages the member 2, an adjusting bolt or screw 10 is passed through an opening 11 in the clamping and holding member and is anchored in the screw threaded opening 12 in the member 1. Adjustment of this screw tends to increase or decrease the friction between the bearing surfaces 3 of the two coupling numbers 1.

The two coupling members each have a pocket 13 formed therein, in this instance of semi-spherical formation so that between them, they form a spherical chamber the center of which is situated at the center or axis of turning between the two members and also in the plane of the dividing line between the two members. Each member also has a conductor passage 14 extending eccentrically therefrom, the inner end of this conductor passage being radial to the spherical chamber and the outer end extending at right angles to the axis of rotation between the two members. To the outer end of each conductor passage, a conductor tubing 14 may be secured. Within the radial portion of each passageway 14 a tubular insulator 16 may be arranged. The two inner ends of the passageways 14 are positioned diametrically opposite each other when the two tubes 15 extend longitudinally of each other.

It will thus be seen that a conductor 17 may extend through the two tubes 15; through the two passageways 14 and through the spherical chamber without imposing any severe bend in the conductor. That portion of the conductor 17 lying within the spherical chamber may be supported by an insulating disk 18 which is of circular formation to fit the walls of the spherical chamber and has a central opening 19 through which the conductor 17 extends.

It is apparent that the two members 1 and 2 may be swung at angles to each other without imposing any severe twisting strains on the conductor 17. The disk 18 acts as a pivot piece to support the central portion of the conductor within the spherical chamber, as said disk is free to move in said chamber. All portions of the conductor are enclosed, thus reducing the fire hazard.

What I claim as my invention and desire to secure by Letters Patent is:

1. In combination with a conductor cable, a coupling for electric fixtures comprising a pair of coupling members each formed with a semi-spherical chamber, the center of which is situated at the axis of turning between the members, each of said members also having a conductor passage eccentric to the axis of turning and the inner ends of the two passages being aligned and an insulating disk loosely mounted in the spherical chamber and having an opening for the passage of a conductor the walls of which fit the cable to cause the insulator to shift in the coupling with the movement of the cable to prevent abrasion of the cable.

2. In combination with a conductor cable, a movable joint having a cable passageway therethrough, and an insulating cable support movable with the cable and in the passageway of the joint in engagement with the walls of the passageway, and spacing said cable from said passageway.

WALTER A. ADAMS.